United States Patent [19]

Saur et al.

[11] Patent Number: 5,095,940
[45] Date of Patent: Mar. 17, 1992

[54] THERMOSTATIC VALVE

[75] Inventors: Roland Saur, Stuttgart; Gerhard Jaiser, Tamma; Jürgen Kunce, Rutesheim; Roland Pflieger, Stuttgart, all of Fed. Rep. of Germany

[73] Assignee: Behr-Thomson Dehnstoffregler GmbH & Co., Fed. Rep. of Germany

[21] Appl. No.: 629,565

[22] Filed: Dec. 18, 1990

[30] Foreign Application Priority Data

Dec. 22, 1989 [DE] Fed. Rep. of Germany ... 8915063[U]

[51] Int. Cl.$^5$ .............................................. F16K 15/04
[52] U.S. Cl. .............................. 137/533.11; 236/34.5; 251/904
[58] Field of Search ............ 236/34.5; 137/519.5, 137/533.11; 251/904

[56] References Cited

U.S. PATENT DOCUMENTS

| 2,672,124 | 3/1954 | McCrary | 137/519.5 X |
| 2,855,127 | 10/1958 | Lerner | 137/533.11 X |
| 3,841,349 | 10/1974 | Todd | 137/519.5 X |
| 3,973,729 | 10/1976 | Sliger | 137/533.11 X |
| 4,059,881 | 11/1977 | Sliger | |
| 4,147,180 | 4/1979 | Steele, Jr. | |

FOREIGN PATENT DOCUMENTS

| 2657512 | 7/1978 | Fed. Rep. of Germany . | |
| 8102817.2 | 2/1981 | Fed. Rep. of Germany . | |
| 1301426 | 7/1962 | France | 137/519.5 |
| 893671 | 4/1962 | United Kingdom . | |

Primary Examiner—Robert G. Nilson
Attorney, Agent, or Firm—Evenson, Wands, Edwards, Lenahan & McKeown

[57] ABSTRACT

A thermostatic valve is disclosed which has a valve disk adjusted by a thermostatic working element. A valve seat and a ventilating valve includes a cage mounted on the valve seat or the valve disk. The cage includes a passage opening and a valve body serving as the closing element for the passage opening. The cage is provided with an entry opening for the valve body which is bordered by at least one elastically deformable tongue which bounds a cross-section of the entry opening which is smaller than the diameter of the valve body.

11 Claims, 3 Drawing Sheets

THERMOSTATIC VALVE

BACKGROUND AND SUMMARY OF THE INVENTION

The invention relates to a thermostatic valve having a valve disk that can be adjusted by a thermostatic working element, as well as having a valve seat and a ventilating valve comprising a cage which is mounted on the valve seat or the valve disk, has a passage opening, and accommodates the valve body serving as the closing element for the passage opening.

In the case of a known thermostatic valve of the initially mentioned type (German Patent Document DE-GM 81 02 817.2), a swivel part is provided as the cage for a valve body constructed as a ball and has an essentially cup-shaped form. After the inserting of the ball into this cage, the outer edge of the cup-shaped swivel part is flanged in such a manner that the remaining opening is smaller than the ball diameter. The bottom of the swivel part is provided with a projection which is fitted through an opening of the valve seat and is then flanged.

It is an object of the invention to provide a thermostatic valve of the initially mentioned type which can be produced at lower cost.

This object is achieved according to preferred embodiments of the invention in that the cage is provided with an entry opening for the valve body which is bordered by at least one tongue that can be elastically deformed for the inserting of the valve body and bounds a cross-section of the entry opening which is smaller than the diameter of the valve body.

By means of this development, it is achieved that the cage of the thermostatic valve as such can be manufactured in one operation, after which it is provided with the valve body without the subsequent requirement of another machining of the cage by flanging or the like. As a result, one operation can be saved during the manufacturing which leads to a significant reduction of manufacturing costs in view of the very large piece numbers that are produced in the case of the manufacturing of such thermostatic valves.

In a further development of the invention, it is provided that the at least one tongue is provided with a projection which projects toward the inside into the entry opening and which, on the outside, is provided with a chamfering and, on the inside, is provided with a stop surface extending essentially transversely to the moving direction of the valve body. As a result, it is achieved that, on the one hand, the valve body can be introduced in a simple manner in which case at least one tongue is automatically spread away during the inserting movement. The stop surface will then provide that the valve body is secured inside the cage.

In a further development of the invention, it is provided that the cage has an essentially cylindrical shape and, at one end, in a front face, is provided with the passage opening and, at the other end, is provided with the entry opening for the valve body. In order to mount elastic tongues on a cage of this type in a simple manner, it is provided in this case that the cage has at least two axial slots which start at the entry opening and bound one tongue. In the normal operation, i.e., when the thermostatic valve is open, the ventilating valve must be closed. As a result of the dynamic forces of the flowing medium, the valve body is brought into the closed position. In order to ensure that dynamic forces act sufficiently on the valve body, it is provided in an expedient development of the invention that the cage has an axial length which corresponds to approximately twice the axial length of the valve body which is preferably developed as a ball, and that the axial slots extend along approximately half the axial length of the cage.

In a further development of the invention, it is provided that the cage is provided in the area of the passage opening with a projection which can be inserted into a recess of the valve seat or of the valve plate and which is equipped with a locking device which can be locked with the valve seat or the valve disk. By means of this development, it is achieved that also the mounting of the cage on the valve disk or the valve seat does not require another machining of the cage, particularly any flanging or the like. As a result, a further work step can be saved during the assembly which further reduces the expenses.

In a particularly advantageous development of the invention, it is provided that the cage is manufactured in one piece with the tongue or tongues and/or the locking device. In this case, it is particularly expedient for the cage to be manufactured as a molded plastic part. The manufacturing of such a cage itself is very inexpensive and, for the above-mentioned reasons, a subsequent machining of the cage is not necessary.

Other objects, advantages and novel features of the present invention will become apparent from the following detailed description of the invention when considered in conjunction with the accompanying drawings.

DETAILED DESCRIPTION OF THE DRAWINGS

Figure 1:
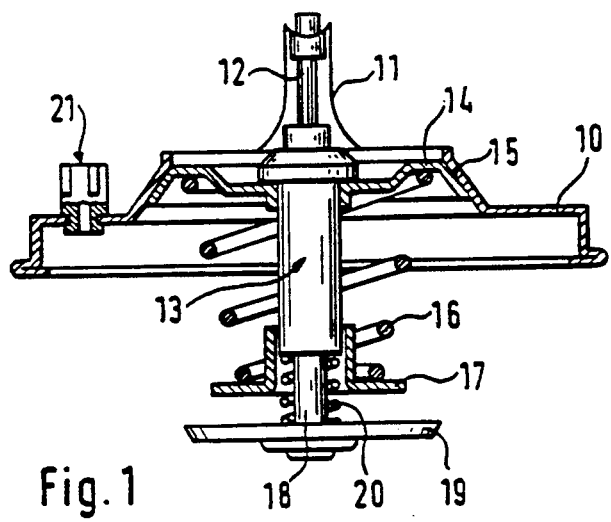
FIG. 1 is an axial sectional view of a thermostatic valve having a ventilating valve, constructed according to a preferred embodiment of the invention.

The thermostatic valve illustrated in FIG. 1 is intended particularly for use in a coolant circulating system of a motor vehicle internal-combustion engine. It has a fastening ring 10 by means of which it is fastened to a housing or the like. A bracket 11 is mounted to this ring 10 at which the piston 12 is held of a thermostatic working element 13. On the housing of the thermostatic working element 13, a valve disk 14 is mounted to which a valve seat 15 is assigned which is formed by the fastening ring 10. The valve disk 14 and thus the housing of the thermostatic working element 13 are loaded by a locking spring 16 which supports itself on the valve disk 14 and an abutment 17. The abutment 17 is a bracket which is mounted on the fastening ring 10. A pin 18 is mounted on the housing of the thermostatic working element 13 as an axial extension, a short-circuit valve disk 19, which is loaded by a spring 20, in a known manner, being slidingly guided on this pin 18.

Figure 2:
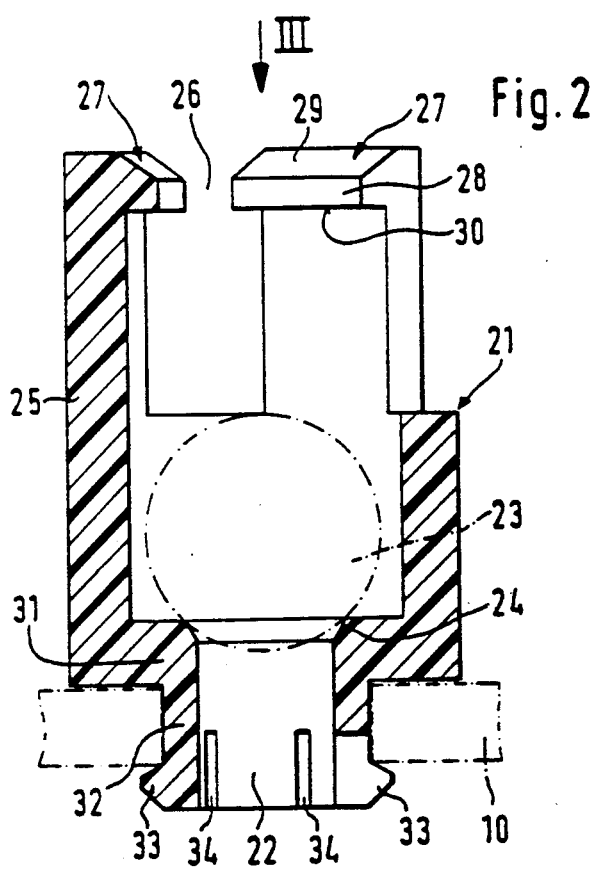
FIG. 2 is an enlarged axial sectional view of the ventilating valve of the FIG. 1 embodiment.
Figure 3:
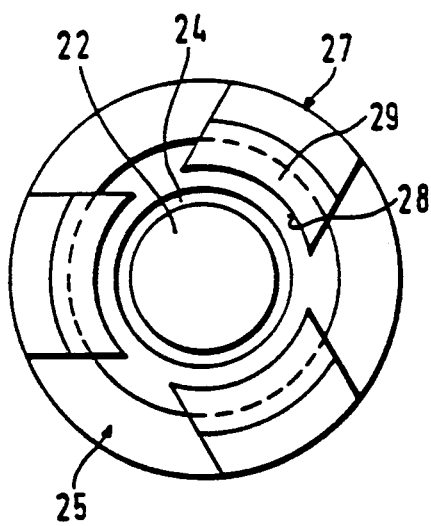
FIG. 3 is a view in the direction of Arrow III of FIG. 2.

On the fastening ring 10 constructed as the valve seat 15, a ventilating valve 21 is mounted which forms a bypass opening to the thermostatic valve against the normal flow direction. The ventilating valve 21 which is enlarged with respect to its details in FIGS. 2 and 3 has a passage opening 22 which extends through the fastening ring 10 constructed as the valve seat 15. A valve body which is constructed as a ball 23 is assigned to the passage opening 22 as a closing element, places itself, as a result of the dynamic flow forces, during the normal flow, against a chamfering 24 of the passage opening 22, and closes it. This ball 23 is freely movably guided in a cage 25 in such a manner that it can lift itself off the passage opening 22 against the normal flow direction in the case of pressure differences. The cage 25 is manufactured in one piece as a molded plastic part, preferably made of polyamide. It has an essentially cylindrical shape which extends as an extension of the passage opening 22. The side situated opposite the passage opening 22 is constructed as an entry opening 26 for the ball 23. This entry opening 26 is bounded by three tongues 27 which are arranged to be uniformly distributed in the circumferential direction and which are each equipped with a projection 28 projecting into the interior. The projections 28 leave a cross-section open which is smaller than the diameter of the ball 23. On the exterior side, facing away from the passage opening 22, the projections 28 are each provided with a chamfering 29 which has an angle of approximately 60° with respect to the axial direction. As a result, it is achieved that when the ball 23 is inserted with a loading in the axial direction, a spreading-open of the tongues 27 takes place so that the ball 23 can pass. On the side facing the passage opening 22, the projections 28 are provided with stop surfaces 30 which essentially extend transversely with respect to the axial direction and thus transversely to the moving direction of the ball 23.

The inside diameter of the cage 25 is by approximately one third larger than the diameter of the ball 23. The axial length of the cage 25 corresponds to approximately twice the ball diameter. The slots remaining between the tongues 27 have approximately the width of the tongues and extend in the axial direction along approximately half the length of the cage. As a result, it is ensured, on one hand, that a sufficient flow cross-section exists while, on the other hand, an elastic deformation of the tongues 27 is permitted in a sufficient manner.

In a modified embodiment, it is provided that the slots between the tongues 27 extend into the area of the chamfering 24 of the passage opening 22. As a result, it will then be possible to reduce the axial length of the cage and nevertheless provide a sufficient elasticity for the tongues 27. However, it may be expedient in this case to reduce the width between the tongues 27 in order to obtain sufficiently large dynamic forces for bringing the ball 23 into the closing position.

The bottom 31 of the cage which is situated opposite the entry opening 26 is provided with an essentially cylindrical projection 32 which contains the passage opening 22. This cylindrical projection 32 is fitted through the fastening ring 10 made of sheet metal which is provided with a corresponding recess. The projection 32 is provided on the outside with detents 33 which reach behind the edges of the breakthrough of the fastening ring 10 facing away from the bottom 31 of the cage 25. In this area, the projection 32 is provided with longitudinal slots 34 so that there is sufficient elasticity in the radial direction in order to permit a compression during the inserting. On the side facing the edge of the recess of the fastening ring 10, the detents 33 are expediently provided with a slope so that the bottom 31 of the cage 25 is pulled to the fastening ring 10 by an elastic force.

In a modified embodiment, it is provided that the projection 32 is provided with an external thread, the thread undercuts of which have a width which corresponds to the thickness of the material of the fastening ring 10. As a result, it is also possible in a simple manner to manufacture the cage 25 as a finished structural member and to securely mount it on the fastening ring 10 without any subsequent machining. In this case, it may be provided that the last thread turn, which connects to the bottom 31, is constructed as a ring groove.

Figure 4:
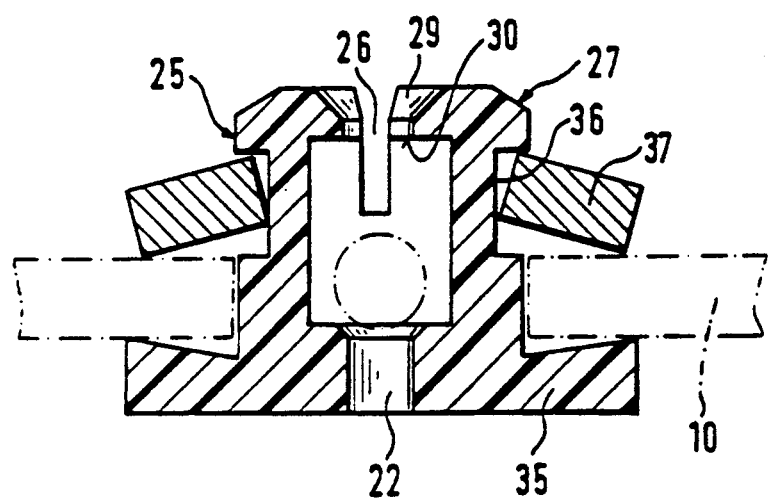
FIG. 4 is an axial sectional view of another embodiment of a ventilating valve which is composed of two parts.
Figure 4A:
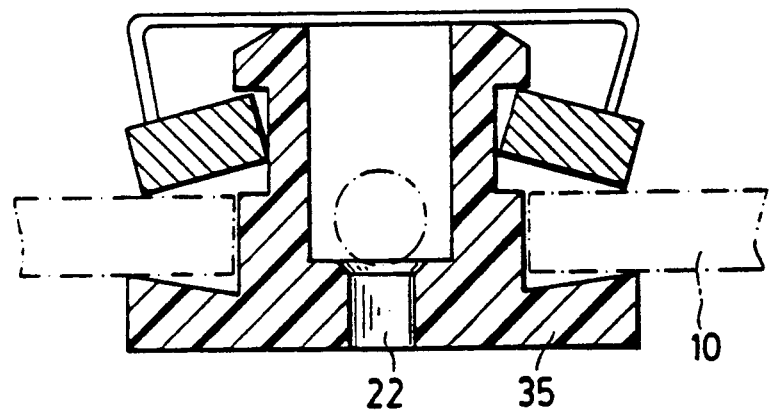
FIG. 4a is an axial sectional view of another embodiment of a ventilating valve having a bracket.

In the embodiment according to FIG. 4, the cage which is manufactured as a molded plastic part is equipped with a flange 35 projecting away toward the outside in the area of the passage opening 22. The cage 25 is fitted through a recess of the valve disk or the valve seat—in the embodiment according to FIG. 1, through a recess of the fastening ring 10—until its flange 35 rests against the edge of this recess. At a distance which approximately corresponds to the material thickness of the fastening ring 10, the cage 25 is provided with a ring groove 36 on the outside. A ring 37 is locked into this ring groove 36 and serves as a counter-flange to flange 35 so that the wall with the recess is clamped between the flange 35 and the ring 37. As shown in FIG. 4, the ring 37 has approximately the shape of a cup spring. The surface of the flange 35 facing the edge to be clamped in rises from the inside toward the outside so that, at first, only the outer edge of the flange 35 rests against the edge area of the recess. By means of the elastic deformation of the ring 37 and/or the flange 35, it is therefore achieved that the cage 25 is held by means of a prestress. The ring 37 may be made of plastic or metal. In an embodiment modified with respect to FIG. 4, as illustrated in FIG. 4c, it is provided that the ring 37 is springy in the radial direction so that, while being widened, it can be slid on from the side of the entry opening 26 and can be locked into the ring groove 36. In order to obtain such an elasticity, the ring 37 is constructed as a spring washer which preferably is provided with a slot 37'.

Figure 4B:
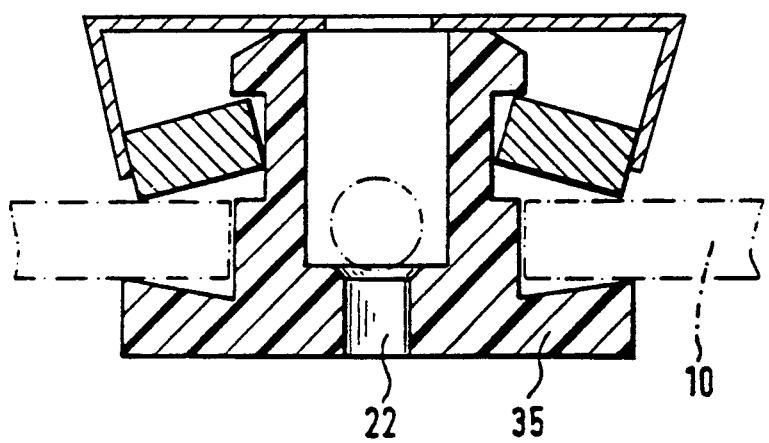
FIG. 4b is an axial sectional view of another embodiment of a ventilating valve having a cap.
Figure 4C:
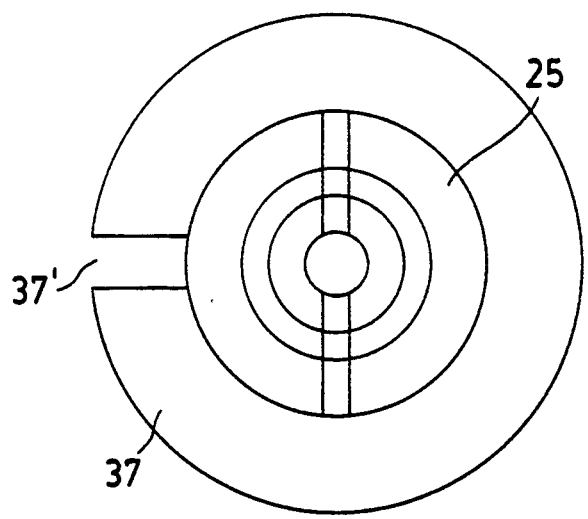
FIG. 4c is an axial sectional view of a lockable ring that is flexible in the radial direction.

In a further modification, illustrated in FIG. 4b, it is provided that the ring 37 is constructed as a radially flexible spring element and, at the same time, is a component of a cap which reaches over the entry opening 26. In the area of the entry opening 26, this cap will then have a recess 39 which is smaller than the diameter of the valve body 23. It is not necessary in this case that the entry opening 26 is bordered by one or several flexible tongues 27. In this case, the cap locked together with the ring 37 in the ring groove 36 takes over the securing of the valve body 23 in order to prevent it from falling out. The same result is reached in another embodiment illustrated in FIG. 4c by the fact that the ring 37 is equipped with a bracket reaching over the entry opening 26. In this case also, elastically deformable tongues 27 are not required; i.e., the cage may have a smooth cylindrical shape on the inside.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. A thermostatic valve comprising:
 a valve disk that can be adjusted by a thermostatic working element, and
  a valve seat and a ventilating valve comprising a cage which is mounted on at least one of the valve seat and the valve disk, has a passage opening, and accommodates a valve body serving as the closing element for the passage opening,
   wherein the cage is provided with an entry opening for the valve body which is bordered by at least one tongue which is elastically deformable for the inserting of the valve body, this tongue bounding a cross-section of the entry opening which is smaller than the diameter of the valve body, said tongue including means for assuring the retaining of the valve body within said cage;
  wherein the at least one tongue is provided with a projection which projects toward the inside into the entry opening, said tongue being provided on the outside with a chamfering and wherein said means for assuring the retaining of the valve body is a stop surface on the inside of said tongue which extends essentially transversely with respect to the moving direction of the valve body.

2. A thermostatic valve according to claim 1, wherein the cage has an essentially cylindrical shape and on one end in a front face is provided with the passage opening, the other end of the cage being provided with the entry opening for the valve body.

3. A thermostatic valve according to claim 2, wherein the cage is manufactured in one piece with the at least one tongue.

4. A thermostatic valve according to claim 1, wherein the cage is manufactured in one piece with a locking device that can lock with at least one of the valve seat and the valve disk.

5. A thermostatic valve according to claim 1, wherein the cage has an essentially cylindrical shape and is provided on one end in a front face provided with the passage opening, the other end of the cage being provided with the entry opening for the valve body.

6. A thermostatic valve according to claim 5, wherein the cage is equipped with at least two axial slots beginning at the entry opening which bound a tongue.

7. A thermostatic valve according to claim 6, wherein the cage has an axial length which corresponds to approximately twice the axial length of the valve body preferably constructed as a ball, and in that the axial slots extend approximately over half the axial length of the cage.

8. A thermostatic valve according to claim 7, wherein the cage is provided in the area of the passage opening with a projection that can be inserted into a recess of at least one of the valve seat and of the valve disk and is provided with a locking device that can lock with at least one of the valve seat and the valve disk.

9. A thermostatic valve comprising:
 a valve disk that can be adjusted by a thermostatic working element, and
  a valve seat and a ventilating valve comprising a cage which is mounted on at least one of the valve seat and the valve disk, has a passage opening, and accommodates a valve body serving as the closing element for the passage opening,
   wherein the cage is provided with an entry opening for the valve body which is bordered by at least one tongue which is elastically deformable for the inserting of the valve body, this tongue bounding a cross-section of the entry opening which is smaller than the diameter of the valve body, said tongue including means for assuring the retaining of the valve body within said cage;
  wherein the cage is equipped with at least two axial slots beginning at the entry opening which bound a tongue.

10. A thermostatic valve comprising:
 a valve disk that can be adjusted by a thermostatic working element, and
  a valve seat and a ventilating valve comprising a cage which is mounted on at least one of the valve seat and the valve disk, has a passage opening, and accommodates a valve body serving as the closing element for the passage opening,
   wherein the cage is provided with an entry opening for the valve body which is bordered by at least one tongue which is elastically deformable for the inserting of the valve body, this tongue bounding a cross-section of the entry opening which is smaller than the diameter of the valve body, said tongue including means for assuring the retaining of the valve body within said cage;
  wherein the cage has an axial length which corresponds to approximately twice the axial length of the valve body preferably constructed as a ball, and has axial slots that extend approximately over half the axial length of the cage.

11. A thermostatic valve comprising:
 a valve disk that can be adjusted by a thermostatic working element, and
  a valve seat and a ventilating valve comprising a cage which is. mounted on at least one of the valve seat and the valve disk, has a passage opening, and accommodates a valve body serving as the closing element for the passage opening,
   wherein the cage is provided with an entry opening for the valve body which is bordered by at least one tongue which is elastically deformable for the inserting of the valve body, this tongue bounding a cross-section of the entry opening which is smaller than the diameter of the valve body, said tongue including means for assuring the retaining of the valve body within said cage;
  wherein the cage is provided in the area of the passage opening with a projection that can be inserted into a recess of at least one of the valve seat and of the valve disk and is provided with an elastic locking device that can lock with at least one of the valve seat and the valve disk.

* * * * *